United States Patent [19]

Diddens

[11] 4,415,913
[45] Nov. 15, 1983

[54] GRAY TONE RECORDER

[75] Inventor: Paul A. Diddens, Denver, Colo.

[73] Assignee: Honeywell Inc., Minneapolis, Minn.

[21] Appl. No.: 271,169

[22] Filed: Jun. 8, 1981

[51] Int. Cl.³ .................... G01D 15/06; H04N 1/22
[52] U.S. Cl. .................................... 346/154; 358/298
[58] Field of Search ............... 346/139 R, 153.1, 154; 358/298-300

[56] References Cited

U.S. PATENT DOCUMENTS 4,347,523  8/1982  Ohara .............................. 358/298 X

FOREIGN PATENT DOCUMENTS 705483  12/1979  U.S.S.R. .............................. 346/154

Primary Examiner—Thomas H. Tarcza
Attorney, Agent, or Firm—Lockwood D. Burton; Mitchell J. Halista

[57] ABSTRACT

A gray tone recorder uses a selective variation in a recording stylus duty cycle of an electrostatic recording system which recording stylus continues to write at full voltage using a dry toner electrostatically attracted to a recording paper by an electrostatic charge deposited by the recording stylus. The full voltage recording operation produces a high degree of consistency in the gray level density while the duty cycle variation is effective to vary the separation between record segments by producing variable length segments within fixed recording time periods to achieve a gray scale record. The toner is subsequently fixed or bonded to the paper to create a permanent record. Input data codes are compared with a sequence of fixed codes during a writing time period to determine the cut-off point of each write cycle. The system is adaptable for a plural stylii write head by supplying individual stylus write data during each write cycle.

16 Claims, 7 Drawing Figures

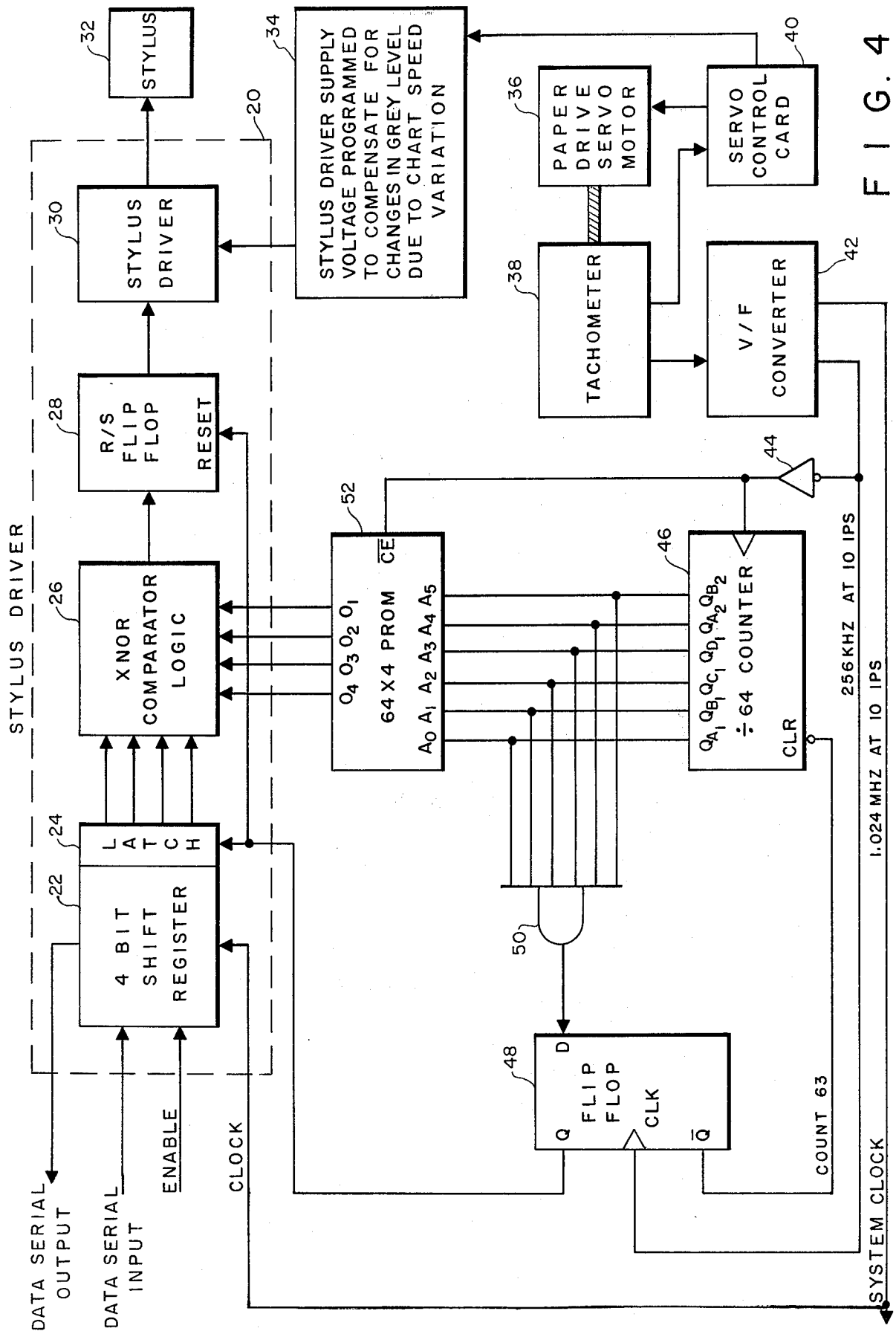

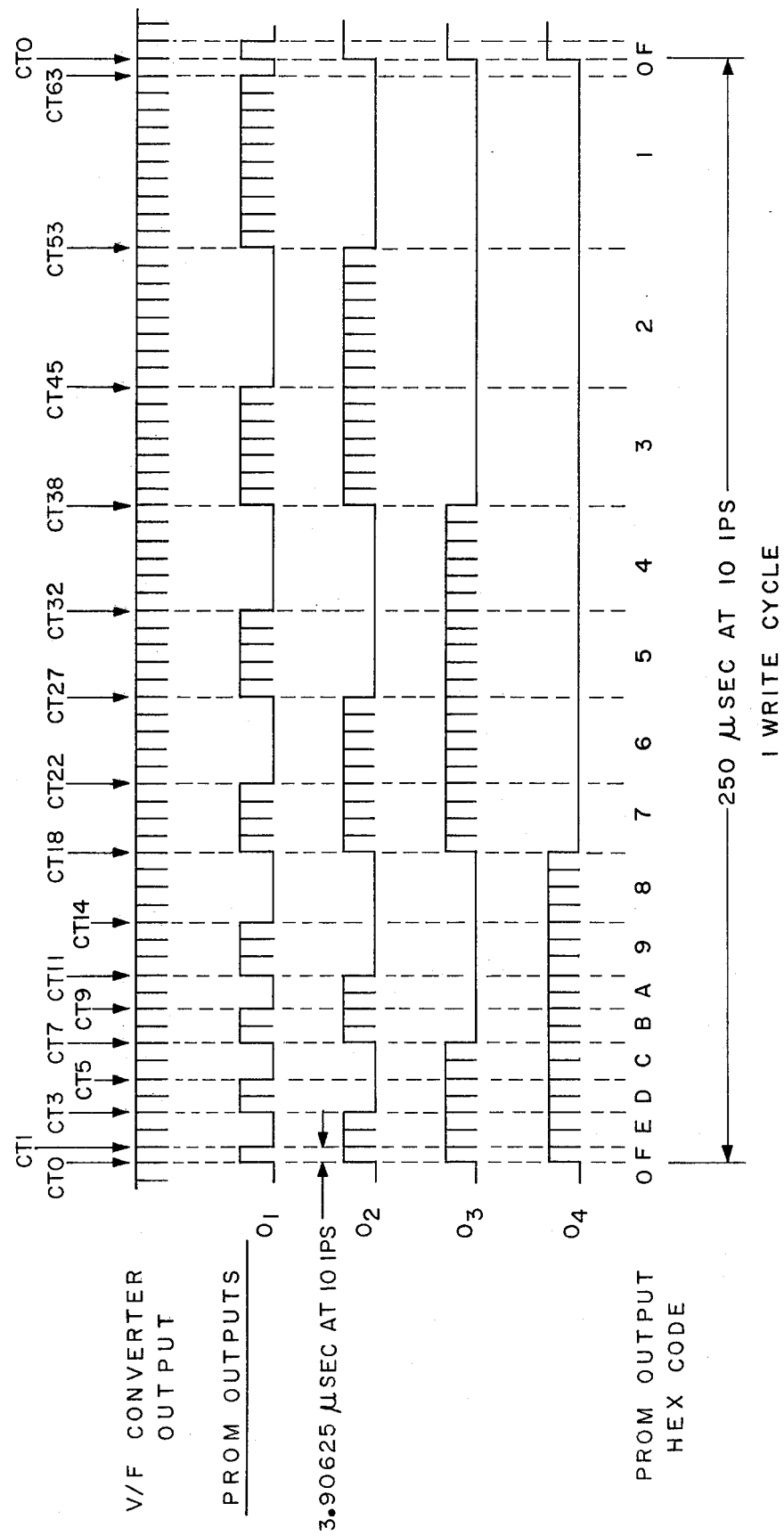

GRAY TONE RECORDER

BACKGROUND OF THE INVENTION

1. Field of the Invention

This invention relates to recorders. More specifically, the present invention is directed to a gray tone recorder apparatus.

SUMMARY OF THE INVENTION

An object of the present invention is to provide an improved gray tone recording apparatus.

In accomplishing this and other objects, there has been provided, in accordance with the present invention a gray tone recorder having a recording stylus assembly arranged to selectively deposit an electrostatic charge in corresponding areas on a recording medium. The recording stylus is driven to deposit the electrostatic charge by a control system which energizes the recording stylus at full voltage with a variable duty cycle to achieve the desired gray tone level. The duty cycle during each write operation or cycle is varied by comparing an input data code with each of a sequence of stored codes to produce a termination of the write operation upon the detection of an equality between the compared codes. Toner means for applying toner to the recording medium including the electrostatically charged areas and means for fixing the toner to the recording paper on the electrostatically charged areas are used to produce a permanent record.

BRIEF DESCRIPTION OF THE DRAWINGS

A better understanding of the present invention may be had when the following detailed description is read in connection with the accompanying drawings, in which:

FIG. 4 is a block diagram of a recording system embodying an example of the present invention, FIGS. 5A, 5B and 5C are waveshape diagrams illustrating the operation of the system shown in FIG. 4.

DESCRIPTION OF THE PREFERRED EMBODIMENT

Figure 1:
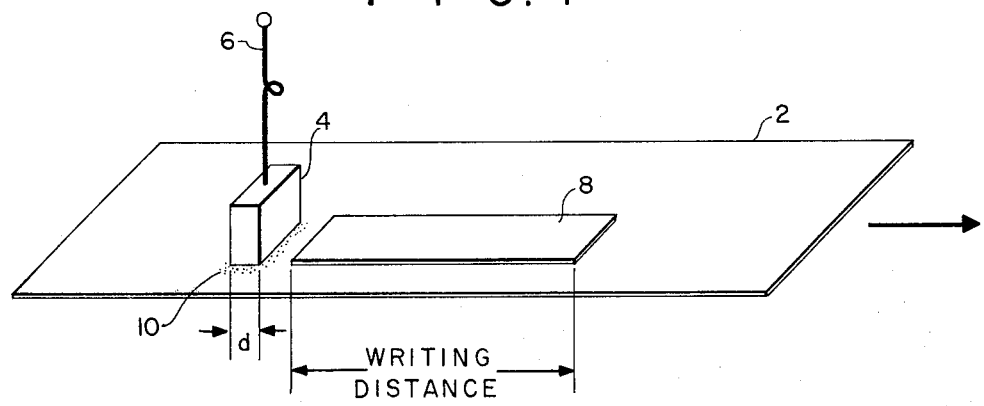
FIG. 1 is a pictorial illustration of an electrostatic recording operation.

Referring to FIG. 1 in more detail, there is shown a pictorial illustration of an electrostatic recording operation. In this recording operation on a recording medium 2, e.g., paper, a recording stylus 4 energized via an electrical connection 6 is used to apply electrostatic charge to a recording medium 2 to produce a recording trace 8. The recording trace 8 is produced by toner particles 10 electrostatically attracted to the recording medium 2 while a fixing means (not shown) is arranged to permanently fix or fuse the toner 10 to the recording medium 2. The conventional prior art techniques for providing gray scale recording with this process involved effecting variations in the stylus voltage to achieve varying gray levels. The recording results achieved with such conventional techniques are subject to wide variations due to differences in paper and toner characteristics, changes in ambient environment and mechanical tolerances in the paper path. The present invention, on the other hand, is directed to a recording apparatus which always writes on the recording medium with full stylus voltage but varies the duty cycle of the writing voltage to achieve the desired gray tone recording thereby achieving high consistency in gray tone density.

The following discussion is directed to the operation of a electrostatic recorder utilizing an example of the present invention as shown in FIGS. 2 to 5A, B and C. For example, at a maximum recording medium speed of 10 inches per second, a longitudinal line on a recording medium 2 is recorded by a recording stylus 4 in 250 microseconds. During that time the recording medium 2 will have moved a distance of 2.5 mils (0.0025"). Thus, the stylus 4 has a recording voltage applied to it via an energizing signal line 6 for 250 microseconds with the recording medium 2 running at 10 ips. The stylus location is shown at the end of the write time for the recording trace 8 when the voltage on the stylus 4 is switched to zero volts. The recording medium 2 and toner particles 10 lose their charges as fast as their associated electrical time constants allow. As a result, the toner particles 10 directly beneath the stylus do not adhere to the recording medium 2. Consequently, the stylus 4 only writes or records at its trailing edge which means that the stylus dimension "D" has no control over the length of the trace 8 which is recorded.

Figure 2:
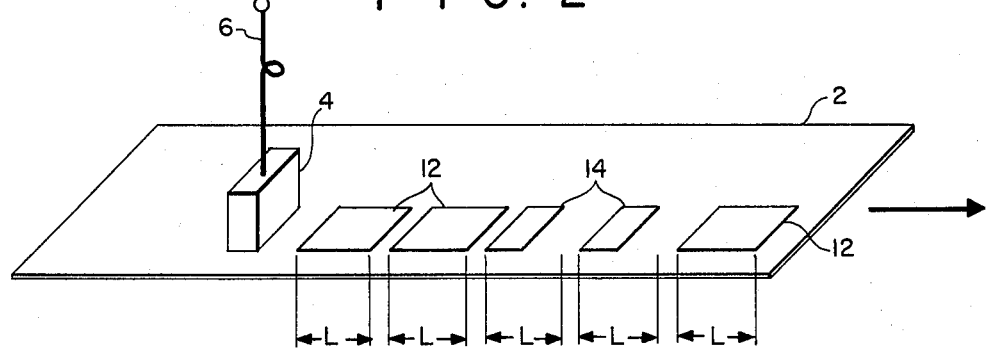
FIG. 2 is pictorial illustration of a recording operation resulting from the use of the present invention.

If the trace 8 were to be recorded in a continuous line, the visible trace density would be at a maximum. If, however, the trace 8 were segmented, the average visible density would be lower as is shown in FIG. 2 since some of the recording medium 2 could be observed between the trace segments. The unaided human eye can ordinarily resolve lines having a spacing as low as 0.1 millimeters (3.9 mils) at a viewing distance of 25 centimeters (10"). Assuming that the maximum length "L" of the segments 12 is 2.5 mils then the spacing between the segments 12 and 14 is less than 2.5 mils which is less than the 3.9 mil spacing which the human eye can resolve. Therefore, the unaided eye of a viewer of the recording should reliably average the light and dark segments of the trace for the spectrum of stylus writing distances from the maximum of 2.5 mils to a minimum distance of approximately 0.5 mils and derive gray levels proportional to the ratio of black to white segments or areas. It is possible to calculate the percentage of the area of the trace required to give equal density steps. The average density of the entire segment is $$D_{Avg.} = \log \frac{1}{f_s(10^{-D_s} - 1) + 1}$$

where $f_s$ is the fractional area of the recorded segment and, for $D_{max} = 1.0$, $$f_s = \frac{1 - 10^{-D}}{.9}.$$

Figure 3:
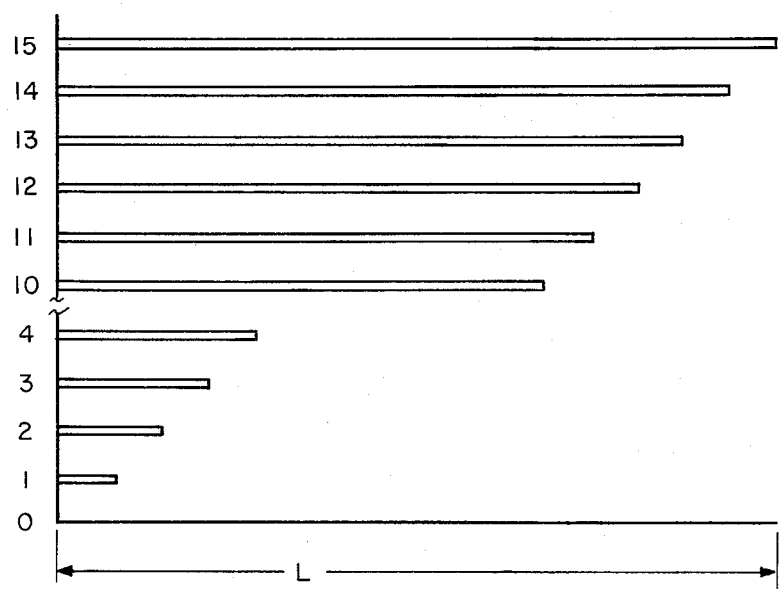
FIG. 3 is a graph of the gray tone recording levels and the resulting recording duty cycle.

FIG. 3 shows a graph of the fraction of the 2.5 mil segment for $D_{max} = 1.0$ which must be written black to obtain the various gray tone levels. The smallest fraction which is not printed black in grey level 10 is 0.017 of the total time period "L".

The following time Table I shows the fraction of each 2.5 mil increment which is printed black.

TABLE I

| GRAY LEVEL | $f_s$ FOR $D_{MAX} = 1.0$ | CLOSEST 1/64 FRACTION | DECIMAL EQUIVALENT OF 1/64 FRACTION |
|---|---|---|---|
| 15 | .983 | 63/64 | .984 |
| 14 | .963 | 62/64 | .969 |
| 13 | .940 | 60/64 | .938 |
| 12 | .914 | 58/64 | .906 |
| 11 | .883 | 56/64 | .875 |
| 10 | .848 | 54/64 | .844 |
| 9 | .807 | 52/64 | .813 |
| 8 | .760 | 49/64 | .766 |
| 7 | .705 | 45/64 | .703 |
| 6 | .643 | 41/64 | .641 |
| 5 | .570 | 36/64 | .563 |
| 4 | .485 | 31/64 | .484 |
| 3 | .390 | 25/64 | .391 |
| 2 | .278 | 18/64 | .281 |
| 1 | .149 | 10/64 | .159 |
| 0 | 0 | 0 | 0 |

The table indicates that a programmable read-only memory (PROM) can be sequenced through sixty-four states or memory locations every time the recording medium 2 moves 2.5 mils. The PROM would generate a respective four bit bindary code for each step in the sequence which code would be compared to another four bit binary code representing the desired gray level to be written. When the two codes or binary numbers were equal, a flip-flop circuit would be set, turning on a recording stylus driver. The remainder of the trace would then be written black on the recording paper and in the correct proportion of black to white to provide a desired gray tone scale. If a counter is used which sequences the PROM thru memory locations 0 thru 63, the following Table II shows the 4 bit output code versus memory locations.

TABLE II

| LOCATION (DEC) | HEX (INPUT) | (OUTPUT) HEX | (OUTPUT) LEVEL |
|---|---|---|---|
| 00 | 00 | F | 15 |
| 01, 02 | 01, 02 | E | 14 |
| 03, 04 | 03, 04 | D | 13 |
| 05, 06 | 05, 06 | C | 12 |
| 07, 08 | 07, 08 | B | 11 |
| 09, 010 | 09, 0A | A | 10 |
| 11, 12, 13 | 0B, 0C, 0D | 9 | 9 |
| 14 thru 17 | 0E thur 11 | 8 | 8 |
| 18 thru 21 | 12 thru 15 | 7 | 7 |
| 22 thru 26 | 16 thru 1A | 6 | 6 |
| 27 thru 31 | 1B thru 1F | 5 | 6 |
| 32 thru 37 | 20 thru 25 | 4 | 4 |
| 38 thru 44 | 26 thru 2C | 3 | 3 |
| 45 thru 52 | 2D thru 34 | 2 | 2 |
| 53 thru 62 | 35 thru 3E | 1 | 1 |
| 63 | 3F | 0 | 0 |

Referring now to FIG. 4, there is shown a block diagram of an example of an embodiment of the present invention. A four bit shift register 22 is used to store the four bit binary code representing the desired gray level. This code is supplied on a data serial input line from the source (not shown) of the recording control signals, e.g., a keyboard, magnetic tape, etc. An "enable" signal representing a zero count is also applied to the shift register 22 to control the setting of a latch circuit 24 after the four bit code is entered in the shift register 22. The operation of the shift register 22 is synchronized by a "clock" signal which is derived from a recording medium drive as hereinafter described. The binary bit output of the latch 24 is applied in parallel as one input to a conventional exclusive NOR comparator logic circuit 26 to be compared with a four bit binary code representing the aforesaid PROM accessing sequence. The output of the comparator 26 is applied to set an R/S flip-flop 28. The output of the flip-flop 28 is applied, in turn, to enable or control a stylus driver 30 which has its output connected to a recording stylus 32 to effect an energization thereof. The stylus driver 30 is supplied from a voltage supply 34 which is controlled or programmed to compensate for gray level changes which may be produced by changes in the speed of the recording medium.

The recording medium 2 is driven by a servo motor 36 at a constant pre-selected speed. The speed selected is determined by the time in which the displayed recording is to be written. A tachometer 38 is mechanically driven by the motor shaft of the motor 36 driving the recording paper and produces an electrical output proportional to the speed which output is applied to a servo control 40 for controlling the speed of the motor 36 at the desired recording medium speed. The tachometer also produces a speed dependent voltage output which, in turn, drives a voltage-to-frequency converter arranged as a phase lock loop circuit. The output of the V/F converter is a pair of clock signals, e.g., 256 KHz and 1.024 MHz for a recording medium speed of 10 ips. In other words, the recording stylus will write once for every 0.0025 inches or 2.5 mils of recording medium movement. The system clock which is generated by the V/F converter 42 must provide 64 clock pulses for every 2.5 mils of medium movement in order to provide the aforesaid sequence drive signals for the PROM. The required clock frequency is $f_{clock} = 64 \ S_P D_L = 256$ kHz where the paper speed $S_p$ is in inches/sec and $D_L$ which is lines per inch is:

$$D_L = \frac{1}{\text{Line Spacing}} = \frac{1}{.0025} = 400 \text{ lines/in}$$

Another method of generating the system clock signal consists of mounting a code wheel (not shown) on the motor shaft. The code wheel contains a large number of lines which are detected by an optical device such as a light emitting diode (LED) and phototransistor assembly to generate a pulse output each time a code wheel line passes between the diode and the detector. The pulse output is used to synchronize a phase-lock loop which multiplies the code wheel frequency to provide the desired clock signals. The lower frequency clock, in either case, is applied through an inverter 44 to drive a ÷64 counter 46 and as a clock signal to a D flip-flop 48. The PROM 52 is programmed to produce four logic outputs (01 through 04) as shown in Table II to define gray level density.

Figure 5B:
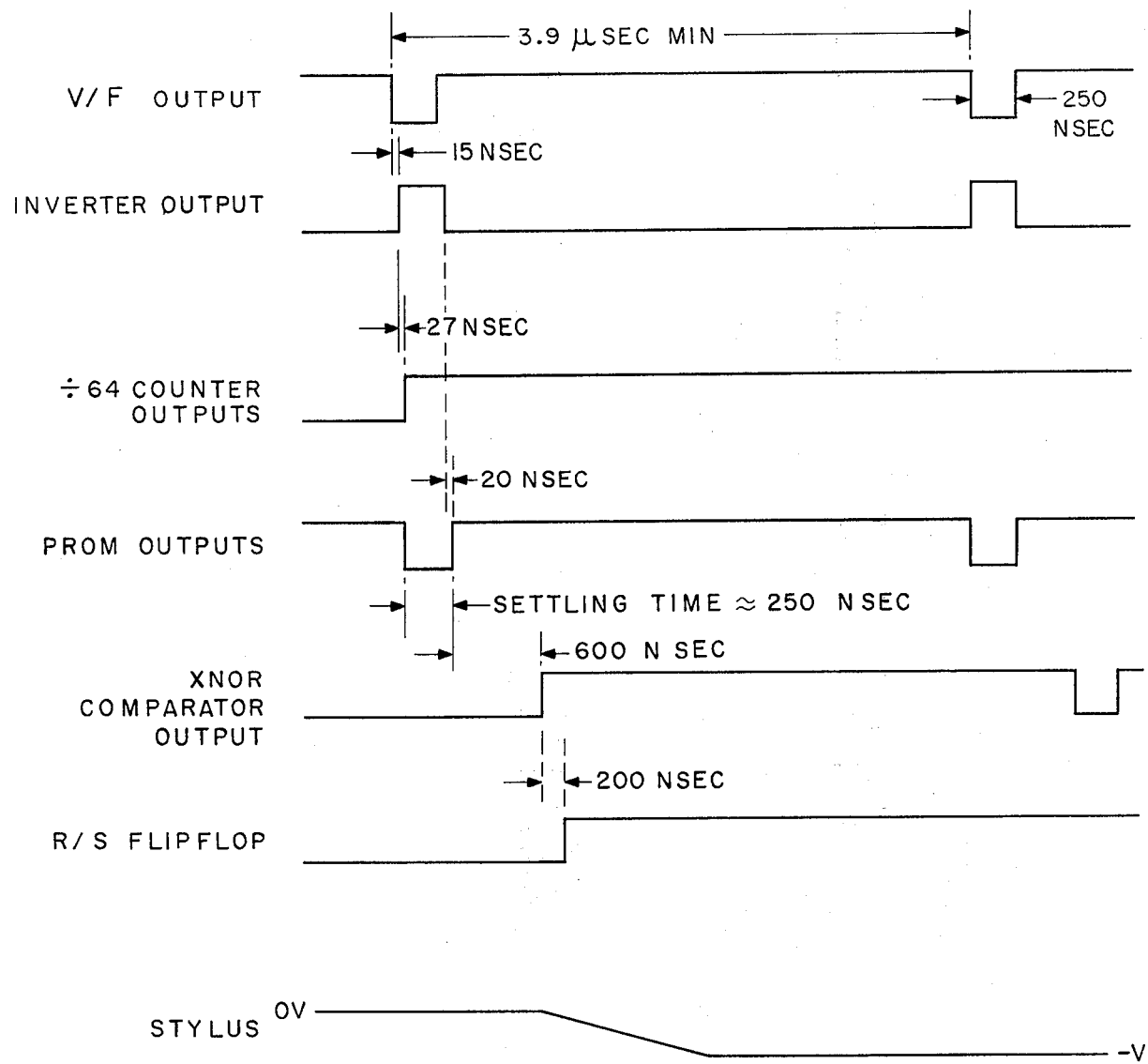
Figure 5C:
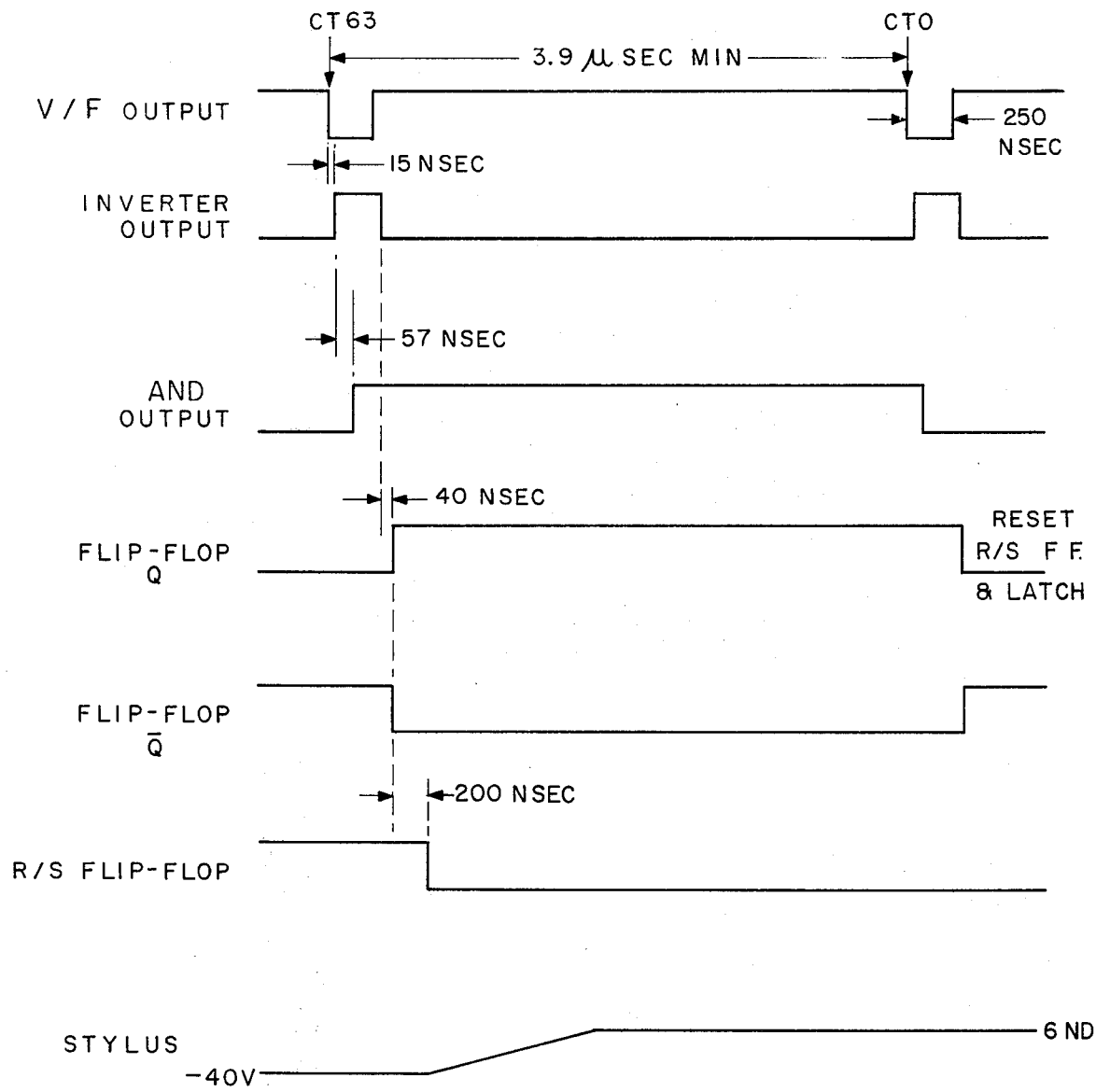

At a count of 63 from the counter 46, the NAND gate 50 produces a high output which sets the D flip-flop 48. The D flip-flop 48 resets by means of its resulting high Q output the R/S flip-flop 28 and the latch 24 containing the data for the previous write cycle. The resetting of the R/S flip-flop 28 turns off the recording stylus 32. Subsequently, the $\overline{Q}$ output of the flip-flop goes high and is applied to the Clear input of the counter 46. The next lower frequency clock pulse clears the counter 46 to zero to start the next write cycle. At a count of "0" the Enable input to the register 22 transfers the data from the four bit shift register 22 into the latch 24. The PROM 52 concurrently outputs a Hex code "F" representing gray level 15 as the first step in its sequence as shown in Table II When the coded output of the PROM at any time during its sequencing as controlled by the counter 46 agrees with that binary code contained in the latch 24, the comparator 26 produces an output which sets the R/F flip-flop 28 to turn on the stylus driver 30 and stylus 32 for the remainder of the write cycle. The aforesaid write cycle then repeats itself to utilize new data in the register 22. The waveforms and their respective time delays produced during the operation of the circuit of FIG. 4 are shown in FIGS. 5B and 5C during stylus turn-on and turn-off periods, respectively, while FIG. 5A shows the waveforms for the operation of the PROM 52. A critical consideration in driving the stylus driver 30 is the R/S flip-flop 28. Since this flip-flop 28 is not clocked, it might respond to spurious pulses such as those generated by logic gates while the gates are changing state. To avoid this, the PROM 52 outputs $O_1$ to $O_4$ are enabled ($\overline{CE}$) about 250 nanoseconds after the new count data is applied to the PROM inputs A0 thru A5.

The loading of the shift register 22 can require a maximum of frequency of 1.2 MHz. Since the shift register 22 has a data serial output, a number of shift registers can be cascaded to minimize the number of input data connections. Since the stylus must write in 250μ sec and since the maximum clock rate is 1.2 MHz, the number of external data memory locations which can be filled in series in one write cycle is the product thereof or 300. Since each shift register requires four bits, the number of stylii which can be addressed in series per each write cycle is 300/4 or 75. Since 64 stylii is the more useful number, the actual clock frequency is $$\frac{4 \times 64}{250 \times 10 - 6}$$

or 1.024 MHz. In a typical arrangement, the recording head would have 400 stylii/in with an 8″ width for a total of 3200 stylii. Such an arrangement would require 3200 shift registers and comparators since a decision to terminate a write operation must be made for each stylus during each write cycle. Other arrangements for driving the stylii which may occur to those skilled in the art without departing from the scope of the present invention such as using a one bit shift register for each stylus and loading the data bits into a group of 32 stylii one bit shift registers in series to produce an array of 32 data bits. After the bits are loaded, they are transferred by a clock to corresponding flip-flops controlling the stylii drivers. Each "1" in a flip-flop would turn on its associated stylus driver and a change to a "0" would turn off its stylus driver. This loading would be performed for the number of trace segments during each write cycle. An external data memory for loading input data bits could be arranged as a pair of memories with each having 100 dual 64 bit shift register. With this arrangement, one data meory could be transferring data for recording while the other memory is collecting new input data.

Accordingly, it may be seen that there has been provided, in accordance with the present invention, an improved gray tone recorder.

The embodiments of the invention in which an exclusive property or privilege is claimed are defined as follows:

1. A recorder comprising
   an electrode means for depositing an electrostatic charge on a recording medium,
   recording medium transport means for transporting a recording medium past said electrode means at a predetermined speed,
   electrode drive means connected to said electrode means for energizing said electrode means to deposit said electrostatic charge in response to a control signal,
   input signal means for storing a digital input signal,
   memory means for storing a plurality of digital signals,
   sequencing means for sequentially addressing said memory means to read out a sequence of said plurality of digital signals,
   comparator means connected to said input signal means and said memory means for comparing said digital signal from said input signal means with each digital signal of said sequence to produce an output signal representative of the detection of an equality therebetween, and
   control means connected to said comparator means for developing said control signal in response to said output signal as a representation of the duration of said comparison operation by said comparator means whereby said electrode drive means is actuated by said control signal to energize said electrode means at the start of said comparing by said comparator means and is deactuated at the detection of said equality by said comparator means to produce a corresponding length of electrostatic charge on the recording medium along the direction of movement of the recording medium during the movement of the recording medium past said electrode means by said transport means.

2. A recorder as set forth in claim 1 wherein said control means includes a flip-flop having one output side connected to supply said control signal to said electrode drive means and a set input connected to said comparator means to be set by said output signal.

3. A recorder as set forth in claim 1 and further including clock means, said transport means controlling said clock means to produce a clock signal having a frequency representative of the speed of said recording medium and circuit means for applying said clock signal to said sequencing means to control the speed of the said sequential addressing of said memory means.

4. A recorder as set forth in claim 3 wherein said sequencing means includes a counter for counting said clock signal to develop an address for said memory means corresponding to each count.

5. A recorder as set forth in claim 4 wherein said memory means includes a PROM having memory locations individually addressed by a corresponding address from said counter.

6. A recorder as set forth in claim 5 wherein said digital signal stored in said input signal means is a multi-bit digital word and said addressing of said PROM is arranged to read out a digital word from each memory location with each stored word having the same number of bits as said multi-bit digital word.

7. A recorder as set forth in claim 1 and further including toner means for depositing a toner on said recording medium following said electrode means and fixer means arranged to fuse the toner retained by said electrostatic charge to said recording medium.

8. A recorder as set forth in claim 1 and further including a fixer means arranged to fuse a toner retained by said electrostatic charge to said recording medium.

9. A recorder comprising:

an electrode means for depositing an electrostatic charge on a recording medium, recording medium transport means for transporting a recording medium past said electrode means at a predetermined speed, electrode drive means connected to said electrode means for energizing said electrode means to deposit said electrostatic charge in response to a control signal, input signal means for storing an input signal and control signal means connected to said input signal means for developing said control signal to have a duration representative of said input signal whereby said electrode drive means is actuated during said control signal to energize said electrode means to produce a corresponding length of said electrostatic charge on the recording medium along the direction of movement of the recording medium during the movement of the recording medium past said electrode means by said transport means.

10. A recorder as set forth in claim 9 wherein said duration of said control signal is a portion of a fixed time interval available for depositing said electrostatic charge to produce said corresponding length of said electrostatic charge.

11. A recorder as set forth in claim 9 wherein said control signal means includes a sequence comparator means connected to said input signal means for comparing said input signal with each of a predetermined sequence of stored signals to determine an equality therebetween to define the duration of said control signal as a portion of a fixed time interval available for depositing said electrostatic charge to produce said corresponding length of said electrostatic charge.

12. A recorder comprising
an electrode means for recording on a recording medium,
recording medium transport means for transporting a recording medium past said electrode means at a predetermined speed,
electrode drive means connected to said electrode means for energizing said electrode to produce said recording in response to a control signal,
input signal means for storing an input signal and
control signal means connected to said input signal means for developing said control signal to have a duration representative of said input signal whereby said electrode drive means is actuated during said control signal to energize said electrode means to produce a corresponding length of a recording by said electrode means along the direction of movement of the recording medium during the movement of the recording medium past said electrode means by said transport means.

13. A recorder as set forth in claim 12 wherein said duration of said control signal is a portion of a fixed time interval available for recording to produce said corresponding length of a recording.

14. A recorder as set forth in claim 12 wherein said control signal means includes a sequence comparator means connected to said input signal means for comparing said input signal with each of a predetermined sequence of stored signals to determine an equality therebetween to define the duration of said control signal as a portion of a fixed time interval available for recording to produce said corresponding length of said recording.

15. A recorder as set forth in claim 12 wherein said control means includes memory means for storing said sequence of stored signals and sequencing means for sequentially addressing said memory means to read out said sequence of stored signals.

16. A recorder as set forth in claim 15 wherein said control means includes a clock means, said transport means controlling said clock means to produce a clock signal having a frequency representative of the speed of said recording medium and circuit means for applying said clock signal to said sequencing means to control the speed of the said sequential addressing of said memory means.

* * * * *